United States Patent
Riedl et al.

(10) Patent No.: US 10,654,741 B2
(45) Date of Patent: May 19, 2020

(54) METHOD FOR PRODUCING A GLASS TUBE WITH A CROSS SECTION OF A NONCIRCULAR FORM BY RESHAPING

(71) Applicant: SCHOTT AG, Mainz (DE)

(72) Inventors: Markus Riedl, Mitterteich (DE); Jonas Zeitler, Mitterteich (DE); Bernd Hoppe, Ingelheim (DE); Wolfgang Kreger, Leonberg (DE); Gottfried Haas, Tirschenreuth (DE)

(73) Assignee: SCHOTT AG, Mainz (DE)

( * ) Notice: Subject to any disclaimer, the term of this patent is extended or adjusted under 35 U.S.C. 154(b) by 216 days.

(21) Appl. No.: 15/899,375

(22) Filed: Feb. 20, 2018

(65) Prior Publication Data
US 2018/0237328 A1 Aug. 23, 2018

(30) Foreign Application Priority Data
Feb. 21, 2017 (DE) .................. 10 2017 202 762

(51) Int. Cl.
*C03B 23/049* (2006.01)
*C03B 40/00* (2006.01)
(Continued)

(52) U.S. Cl.
CPC .......... *C03B 23/0493* (2013.01); *C01B 32/20* (2017.08); *C03B 23/049* (2013.01);
(Continued)

(58) Field of Classification Search
CPC ... C03B 23/043; C03B 23/045; C03B 23/049; C03B 23/0493; C03B 23/092
See application file for complete search history.

(56) References Cited

U.S. PATENT DOCUMENTS 7,337,745 B1 * 3/2008 Komino .............. H01L 21/6831
118/723 E
2005/0183457 A1 * 8/2005 Hirota .................... C03B 11/08
65/102
(Continued)

FOREIGN PATENT DOCUMENTS

DE 102004060409 A1 6/2006
WO 2016123315 A1 8/2016

OTHER PUBLICATIONS

Britannica Online Encyclopedia, "Industrial Glass", captured Sep. 9, 2014, 26 pages. (Year: 2014).*

*Primary Examiner* — Lisa L Herring (57) ABSTRACT

The invention relates to a method for producing glass tubes with a cross section of a noncircular form by reshaping. This method includes at least providing a glass tube, heating the glass tube, providing at least one reshaping tool, which has a forming body with a forming area for reshaping the heated glass tube, the forming body including at least one open-porous material, setting a gas pressure in the interior of the reshaping tool lower than 90 kPa, so that a negative pressure is produced on the forming area, and reshaping the heated glass tube by applying a compressive force perpendicularly to the longitudinal axis of the glass tube, the compressive force being generated by the reshaping tool and being applied to the outer surface of the glass tube, and the outer surface of the glass tube being fixed by the negative pressure.

15 Claims, 8 Drawing Sheets

(51) Int. Cl.
    *C03B 23/043*     (2006.01)
    *C03B 23/045*     (2006.01)
    *C03B 29/06*     (2006.01)
    *G06F 1/16*     (2006.01)
    *C03C 3/091*     (2006.01)
    *C04B 38/00*     (2006.01)
    *C01B 32/20*     (2017.01)

(52) U.S. Cl.
    CPC .............. *C03B 40/00* (2013.01); *C03C 3/091* (2013.01); *C04B 38/0058* (2013.01); *G06F 1/1626* (2013.01); *G06F 1/1637* (2013.01); *C03B 23/043* (2013.01); *C03B 23/045* (2013.01); *C03B 29/06* (2013.01); *C03B 2215/41* (2013.01); *G06F 1/1656* (2013.01); *Y02P 40/57* (2015.11)

(56) References Cited

U.S. PATENT DOCUMENTS

| | | | |
|---|---|---|---|
| 2006/0141181 A1 | 6/2006 | Langsdorf | |
| 2014/0190211 A1* | 7/2014 | Donelon | C03B 23/049 65/32.3 |
| 2017/0129798 A1* | 5/2017 | Steinwandel | C03B 23/13 |

* cited by examiner

METHOD FOR PRODUCING A GLASS TUBE WITH A CROSS SECTION OF A NONCIRCULAR FORM BY RESHAPING

This application claims priority of German patent application DE 10 2017 202 762.2 filed Feb. 21, 2017.

TECHNICAL FIELD OF THE INVENTION

The present invention relates to a method for producing a glass tube with a cross section of a noncircular form by reshaping with high precision and quality of the surface. The invention also relates to the use of this method for producing housings for mobile electronic devices.

BACKGROUND OF THE INVENTION

Field of the Invention

Many applications for glass tubes with a cross section of a noncircular form are known from the prior art, with differing requirements for example for the dimensions of the tube, the cross sectional geometry or the quality of the surface. In addition, there is on the one hand the requirement that such glass tubes can be produced at lowest possible cost and on the other hand the requirement that they can be produced with appropriate precision and reproducibility.

With respect to the shaping of glass tubes, a distinction is made in principle between continuous and discontinuous methods. Because of the usually fundamentally different method parameters, principles that are applied in the case of continuous production methods cannot be transferred to discontinuous methods, or at least not easily, and so they do not provide a person skilled in the art with any indication of how to improve discontinuous production methods.

Description of the Related Art

Thus, for example, the applicant's patent application DE 10 2004 060 409 A1 describes a method for redrawing cast glass tubes for producing glass tubes with a cross section formed in any way desired. For this, the tube, which has previously been cast to a desired form and cut to length, is clamped in a holding device, partially heated and then drawn to the desired outside diameter. However, among the factors on which the production tolerances of this process depend is the constancy of the drawing rate.

WO 2016/123315 A1 on the other hand describes a method for reshaping glass tubes with high precision and quality of the surface by compressive loading perpendicularly to the longitudinal axis of the glass tube. However, the method described there has the disadvantage that it is essential for the reshaping to laboriously set the gas pressure in the space inside the glass tube to a value dependent on the form to be achieved and the thermal properties of the glass composition used.

SUMMARY OF THE INVENTION

The object of the present invention is consequently to overcome the disadvantages of the prior art and provide a method for producing glass tubes with a cross section of a noncircular form with high precision and quality of the surface that is suitable for low-cost production of large numbers.

The invention achieves these objects by a method according to Claim 1 and by a use according to Claim 11.

Advantageous refinements and developments of the invention are provided in the dependent claims.

According to the present invention, a method for producing a glass tube with a cross section of a noncircular form by reshaping comprises at least the steps of:

providing a glass tube having a longitudinal axis and an outer surface, heating the glass tube, providing at least one reshaping tool having an interior, which has a forming body with a forming area for reshaping the heated glass tube, the forming body comprising at least one open-porous material, setting a gas pressure in the interior of the reshaping tool that is lower than 90 kPa, so that a negative pressure is produced on the forming area of the forming body, and reshaping the heated glass tube by applying a compressive force perpendicularly to the longitudinal axis of the glass tube, the compressive force being generated by the reshaping tool and being applied to the outer surface of the glass tube, and the outer surface of the glass tube being fixed by the negative pressure on the forming area of the forming body.

According to the invention, the cross section of a glass tube should be understood here as meaning the form of the outer contour of the glass tube that is obtained by taking a section through the glass tube along a plane which is perpendicular to the longitudinal axis of the glass tube. Thus, for example, a glass tube that is formed as a hollow cylinder has a circular cross section and all the points on the surface of the glass tube are at the same distance from the longitudinal axis. In the case of a glass tube of which the cross section is of a noncircular form, on the other hand, generally not all of the points on its surface are at the same distance from the longitudinal axis.

Thus, the aspect ratio of the cross section can be defined as the ratio of the extent of the cross section in the direction of its greatest extent to the extent of the cross section in the direction perpendicular thereto. For example in the case of a glass tube with a circular cross section, this aspect ratio assumes the value 1; in the case of a glass tube with an elliptical cross section, it corresponds to the ratio of the semi-major axis to the semi-minor axis, in the case of a rectangular cross section to the ratio of the width to the height, assuming that the width of the rectangle is greater than or equal to the height thereof.

First, according to the invention, glass tubes are provided. In principle, all glass compositions from which glass tubes can be produced are conceivable as the starting material for these tubes, that is to say for example soda-lime silicate glass, borosilicate glass or aluminosilicate glass. Among the names under which such glasses are sold are AR-Glas®, DURAN® and SCHOTT 8252. For applications that have particular requirements for mechanical stability, the use of glass compositions with increased breaking strength or of glass compositions that can be toughened chemically is preferred. Optionally, before they are provided, these tubes may be cleaned, in order for example to remove from the surface particles that could have an adverse effect on the surface quality after the reshaping.

The method according to the invention is particularly well suited for the reshaping of glass tubes with a maximum extent in cross section of 5 to 200 mm and a length along the longitudinal axis of 50 to 300 mm. It is however also possible to reshape longer tubes by the method according to the invention and subsequently separate them individually into lengths of tube of the desired dimensions. Preferably, after the reshaping and possibly individual separation, the tubes or lengths of tubes should be longer than the final size of the product to be produced, in order to allow a working of the edges that follows the reshaping, for example in the form of a grinding and polishing process. However, the lengths of tube should not be longer than is necessary for this, in order to avoid unnecessary excess material. The wall thickness of the tubes used is preferably between 0.3 and 2.0 mm.

Various possibilities come into consideration for choosing the cross section of the glass tubes provided. Glass tubes with a circular cross section especially offer the advantage that they can be produced in large quantities, and can correspondingly be obtained at low cost. Glass tubes with an elliptical cross section that comes closer to the aspect ratio to be achieved of the reshaped tube than a circular cross section can be reshaped in a shorter time, possibly with fewer steps, than tubes with a circular cross section, and consequently offer potential for increasing the throughput of the method according to the invention. Furthermore, glass tubes which have a cross section that in some other way comes close to the cross section to be achieved, for example glass tubes with a substantially rectangular cross section, may also be used.

With the method according to the invention, it is possible in particular to produce glass tubes with an aspect ratio which on the one hand is greater than the aspect ratio of the cross section of the glass tube before the reshaping and on the other hand is greater than 3:1, preferably greater than 6:1 and particularly preferably greater than 9:1. The aspect ratio may be up to 12:1.

According to the invention, before the reshaping, the glass tubes provided are heated, preferably to a temperature between the annealing point and the softening point. The annealing point corresponds in this case to the temperature at which the glass has a viscosity of $10^{13}$ dPa·s. The softening point corresponds to that temperature at which the glass has a viscosity of $10^{7.6}$ dPa·s. Both temperatures are material properties, and consequently depend greatly on the glass composition chosen.

The heating of the glass tube may be achieved in this case by many different methods. Various heating elements, such as for example electrically heated or fossil-heated ovens, infrared emitters or lasers may be used for this. In fossil-heated ovens, oxy-fuel gas burners may be used in particular. Depending on the heating element, it may be advantageous in this case either to rotate the glass tube about the longitudinal axis during the heating, in order to achieve the most uniform possible take-up of the heat, or to fix the glass tubes on a refractory base without them being rotated. Preferably, the temperature of the glass tube should be set to be as homogeneous as possible, in order to allow the most uniform possible deformation. Particularly preferably, the coldest point and the warmest point of the tube should differ in their temperature by a maximum of 10 K, preferably a maximum of 5 K.

The at least one reshaping tool is on the one hand suitable for allowing a compressive force to be applied to the glass tube perpendicularly to the longitudinal axis of the glass tube, for example by being moved in the appropriate direction, and the glass tube thereby pressed against a base or against a second reshaping tool. On the other hand, it comprises a forming body, which has a forming area for reshaping the heated glass tube. The forming body should therefore be understood according to the invention as meaning the part of the reshaping tool of which the surface comes into contact with the glass tube during the reshaping.

According to the invention, the surface of the forming body is referred to as the forming area. The forming area is in this case designed in such a way that it predetermines the cross-sectional geometry of the outer surface of the glass tube after the reshaping step. For this purpose, in a development of the invention it may be formed in a specific way, that is to say for example be formed as planar or have a curvature.

In a development of the invention, the forming body is greater than the glass tube along the longitudinal axis of the glass tube, so that the entire glass tube can be reshaped. This avoids unreshaped regions being left at the ends of the glass tube after its reshaping, such regions having to be removed in a downstream processing step and representing production scrap. The reshaping of a glass tube along its entire length accordingly has the effect of increasing the rate of production and the efficiency of the resources of the production method.

According to the invention, the forming body comprises at least one open-porous material. The forming body is permeable to gases, at least where it comprises open-porous material, so that, when a gas pressure of less than 90 kPa is applied in the interior of the reshaping tool, a negative pressure is produced on the surface of the forming area when there is contact with the glass tube. The level of the negative pressure on the forming area can be set according to the invention by the pressure in the interior of the reshaping tool, by the choice of the open porosity of the material and the material thickness thereof.

In a development of the invention, the at least one porous material has an open porosity of between 1% and 50%, preferably between 10% and 45% and particularly preferably between 15% and 40%. If the forming body is made up of a number of porous materials of different porosities, the porosity of the materials used for this may even be up to 90%. This is advantageous in particular whenever the forming body is intended to have at the same time a surface that can be polished very well, a high permeability to gases and a high mechanical stability.

In a further development of the invention, the reshaping tool has in its interior at least one cavity, which serves the purpose of homogeneously distributing the gas pressure in the volume enclosed by it.

In a further development of the invention, the open-porous material may comprise graphite, ceramic and/or metal. Examples of this are glass-fibre- or carbon-fibre-reinforced graphite or composite graphite materials, ceramic, metals and metal alloys. Preferably, the material comprises isostatically pressed graphite. If it is advantageous, for example for reasons of mechanical stability, the forming body may also comprise a number of these materials. When choosing the open-porous material, it should be ensured that it does not chemically react with the glass at the temperatures required for the reshaping.

According to the invention, when it is in contact with the forming body of the reshaping tool during the reshaping, the glass tube is fixed by the gas pressure of less than 90 kPa set in the interior of the reshaping tool and the negative pressure on the forming area of the forming body that is a result of this gas pressure and the use of the open-porous material.

Furthermore, the negative pressure has the effect that the outer surface of the glass tube lies against the forming area at least over part of the area thereof. Preferably, the outer surface lies against the part of the forming area available for the reshaping over the full area thereof, at least towards the end of the reshaping step, the full area referring to the forming area and not to the surface of the glass tube. The inventors have found in this respect that ideal results of the reshaping can be achieved in a development of the invention whenever the gas pressure at least in a partial volume in the interior of the reshaping tool is set to a value between 0.1 kPa and 30 kPa. It is in this case particularly advantageous if the resultant negative pressure on the forming area is adapted to the viscosity of the glass.

It may also be advantageous to change the volume of the partial volume in which the negative pressure is set during the reshaping by a suitable controllable mechanism within the reshaping tool. This allows the partial volume to be adapted to the proportion of the forming body that is in contact with the glass tube. As a result, when reshaping inside an oven, the amount of hot gas that is extracted from the oven can be minimized, whereby in turn the energy efficiency of the production process is improved.

Among the effects of the fixing of the glass tube to the forming body is that it prevents the glass from being deformed in an uncontrolled manner due to the reduced viscosity as a result of the heating, for example under the effect of its own weight, and prevents it from assuming an undesired, often bone-shaped, cross section. A bone-shaped cross section has in this case a constriction in its middle. Therefore, the fixing allows glass tubes still to be precisely reshaped in particular when they have a low viscosity, and at correspondingly high temperatures, without any increased effort.

Depending on the porous materials used and the later intended use of the glass tube, it may be advantageous in a development of the invention if the forming area is configured with a polished mirror finish, that is to say has a surface roughness in the submicrometre range. As a result, an average surface roughness of the reshaped glass tube of $R_z < 1$ µm, measured in accordance with DIN EN ISO 4287, and consequently a very high optical quality of the glass tube, can be achieved. At the same time, this has the effect of preventing the surface from being damaged by the forming area, for example in the form of very fine scratches, and consequently also of improving the mechanical stability of the reshaped glass tube.

The porosity of the forming body therefore allows negative pressure to be generated in particular also at such locations of the forming area where the local form is to be transferred to the glass tube. In other words, the forming area can serve at the same location both as a local forming mould and as a local negative pressure source. This allows glass tubes to be reshaped in such a way that they are distinguished by a surface quality that is optically perfect.

In another embodiment of the invention, the porous material of the forming body has in dependence on the porosity and the negative pressure to be achieved a thickness of between 0.2 and 4 mm. As a result, a value of the negative pressure that is ideal for the reshaping can be set. It may also be required here to mechanically stabilize the forming body on the side opposite from the forming area by webs, that is to say regions with an increased material thickness. As an alternative to stabilization by webs, a forming body may also comprise a thin mirror-polished material that is mechanically reinforced from the rear side by a thicker material with a higher porosity.

In a further development of the invention, the negative pressure on the forming area has in a defined manner different values at different locations of the forming area. For this, the reshaping tool may be formed in such a way that different gas pressures can be set in different regions of the forming body. Alternatively, the material thickness or the porosity of the forming body may be locally varied in a specific way, in order to allow different values of the negative pressure on the forming area even when there is a negative pressure applied uniformly in the interior of the forming tool. This allows for example channels or recesses to be formed in the forming body. These can be used for example to apply greater suction to the middle region of the tube surface, which has a bone-shape-forming tendency, than to the peripheries.

In a further development of the invention, it is also possible for a number of reshaping tools to be used one after the other in a number of reshaping steps, each reshaping step bringing the cross section of the glass tube closer to the cross section to be achieved. Furthermore, between these reshaping steps there may be further heating steps or continuous heating throughout, for example in order to compensate for cooling down of the glass tube during the preceding reshaping step or in order to set a desired viscosity of the glass for the following forming step.

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

DESCRIPTION OF THE DRAWINGS

The invention is described below by way of example and with reference to the accompanying drawings, from which further features and advantages emerge. In the schematic drawings.

DETAILED DESCRIPTION OF PREFERRED EMBODIMENTS

Figure 1A:
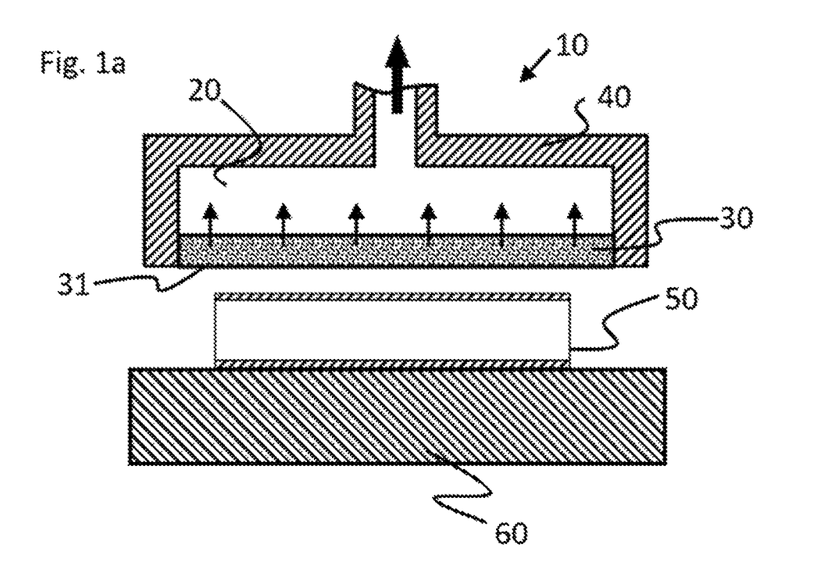
FIG. 1a shows a reshaping tool, a glass tube and a base before the beginning of the reshaping of the glass tube by the reshaping tool in a section along the longitudinal axis of the glass tube.

FIG. 1a shows in a schematic representation, in a section along the longitudinal axis of the heated glass tube 50, a reshaping tool 10, which has a cavity 20, a forming body 30 with a forming area 31 and a wall 40 and also a base 60, on which the glass tube 50 rests. The cavity 20 is in this case enclosed by the forming body 30 and the wall 40. The glass tube 50, the reshaping tool 10 and the base 60 are shown after the heating of the glass tube and before the reshaping by the reshaping tool.

The forming body 30 is made of an open-porous material, for example of isostatically pressed graphite, and is configured with a planar forming area 31. Furthermore, the forming area 31 is mirror-polished.

The glass tube 50 is shorter in the direction of its longitudinal axis than the reshaping tool 10 and the forming body 30, so that the tube 50 can be reshaped in its entire length without leaving unreshaped peripheral regions of the tube 50.

The glass tube 50 rests on the base 60. The base 60 is for example likewise produced from isostatically pressed graphite, but may also be produced from other sufficiently temperature-resistant materials, such as ceramics or metals. The surface of the base 60 that is in contact with the glass tube 50 is mirror-polished. The base 60 may also be configured in such a way that it can be used for transporting the glass tube, for example from a device for heating the glass tube to the reshaping tool 10, and consequently serves as a transporting support. The use of the base 60 as a transporting support inside an oven is also possible, in particular if the space inside the oven has an inert or reducing atmosphere.

In the region of the cavity 20, a gas pressure of less than 90 kPa prevails. This negative pressure may be generated for example by a means for generating a negative pressure, for example a diaphragm pump or rotary vane pump, being connected to an opening provided for it of the reshaping body 10 and operated. Since the forming body 30 is formed with an open porosity, and consequently so as to be permeable to gases, a gas flow through the forming body and the reshaping tool is produced by the negative pressure, which is schematically represented in FIG. 1a by arrows. Since the material thickness of the forming body 30 represented in FIG. 1a is constant along its entire extent and the cavity 20 likewise extends over the entire length of the forming body 30, the gas flow through the forming body 30 is substantially constant along its length. This results in a substantially homogeneous negative pressure on the forming area 31 when there is contact with the glass tube 50.

Figure 1B:
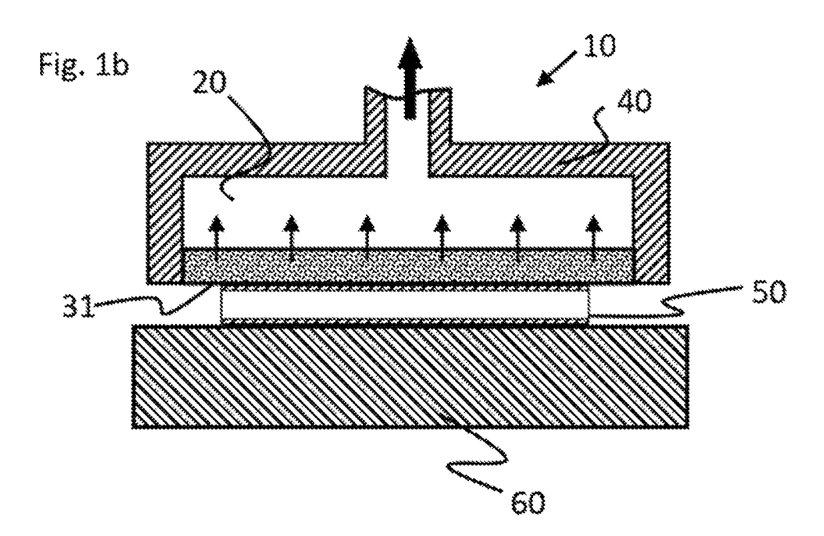
FIG. 1b shows the reshaping tool, the glass tube and the base as shown in FIG. 1a at the end of the reshaping of the glass tube by the reshaping tool in a section along the longitudinal axis of the glass tube.

FIG. 1b shows the reshaping tool 10, the base 60 and the glass tube 50 as shown in FIG. 1a at the end of the reshaping by the reshaping tool. The reshaping tool 10 was thereby moved perpendicularly to the longitudinal axis of the glass tube 50, so that it comes into contact with the glass tube and presses it against the base 60 in such a way that it exerts a compressive force on the glass tube 50 perpendicularly to the longitudinal axis of the glass tube 50. The glass tube 50 is in this way fixed on the forming area 31 by the negative pressure on the forming area 31. It is thereby prevented that undesired deformations, such as for example constrictions or depressions, form in the middle region of the glass tube 50.

Figure 2A:
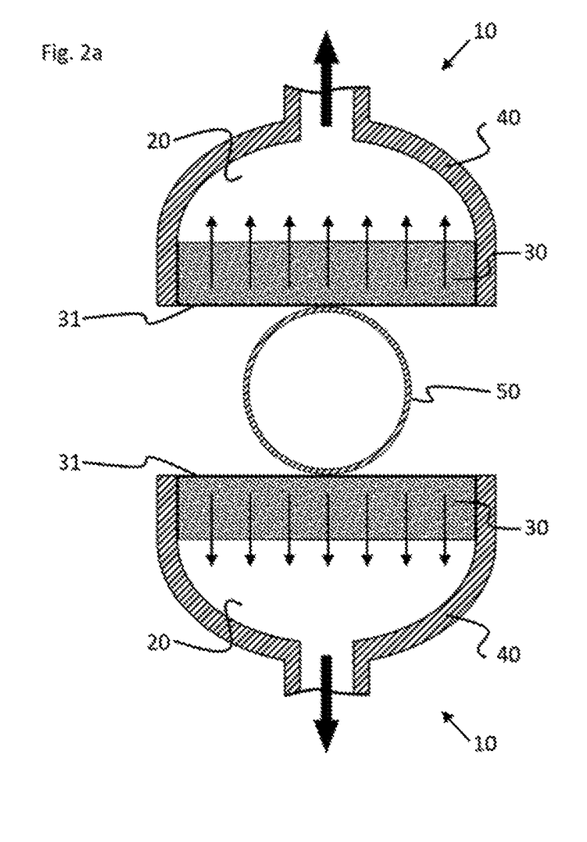
FIG. 2a shows two reshaping tools with planar forming bodies and a glass tube before the beginning of the reshaping of the glass tube by the reshaping tools in cross section perpendicularly to the longitudinal axis of the glass tube.

FIG. 2a shows in a cross section perpendicularly to the longitudinal axis of the glass tube 50 two reshaping tools 10 with in each case a planar forming body 30 and a wall 40, which together enclose a cavity 20. The reshaping tools 10 and the glass tube 50, which has a circular cross section, are shown before the beginning of the reshaping of the glass tube by the reshaping tools.

The reshaping tools 10 represented in FIG. 2a are configured in each case in the same way as the reshaping tool 10 as shown in FIG. 1a and are arranged in such a way that they can be moved perpendicularly to the longitudinal axis of the glass tube 50, and consequently, by moving in opposite directions, exert a compressive force on the glass tube 50 perpendicularly to the longitudinal axis of the glass tube 50.

Figure 2B:
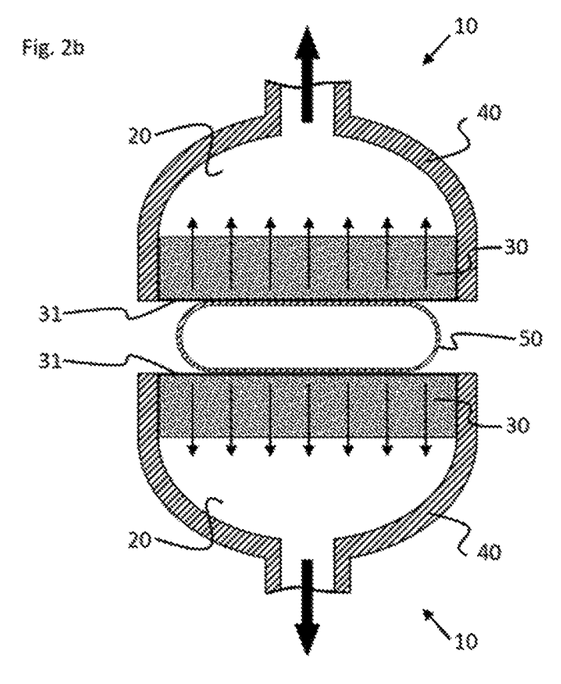
FIG. 2b shows the reshaping tools and the glass tube as shown in FIG. 2a at the end of the reshaping of the glass tube by the reshaping tools in cross section perpendicularly to the longitudinal axis of the glass tube.

FIG. 2b shows the reshaping tools 10 and the glass tube 50 as shown in FIG. 2a at the end of the reshaping of the glass tube 50 by the reshaping tools 10. The outer wall of the glass tube 50 is fixed in the contact region to the forming areas 31 by the negative pressure and lies against the forming areas 31 on the respective sides. The fact that the two forming areas 31 are configured as planar and are arranged plane-parallel has the result that the reshaped glass tube 50 has an oval cross section with two planar side parts parallel to one another and also two rounded peripheral regions. Since the negative pressure on the forming area 31 is constant over the entire width of the forming area 31, the surface of the glass tube 50 is fixed on the forming area 31 with a constant force.

Figure 3A:
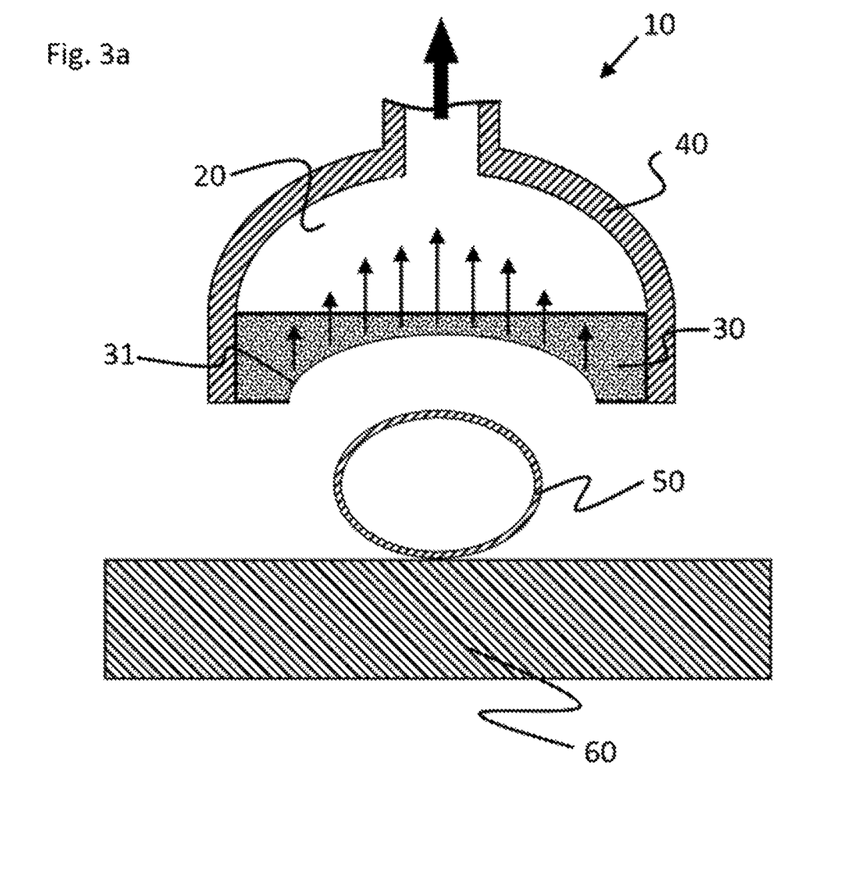
FIG. 3a shows a reshaping tool, a glass tube and a base before the beginning of the reshaping of the glass tube by the reshaping tool in cross section perpendicularly to the longitudinal axis of the glass tube.

The embodiment of a reshaping tool 10 that is represented in FIG. 3a differs from the embodiment of the reshaping tools 10 that is represented in FIG. 2a to the extent that the forming body 30 is not formed as planar. On the one hand, it has a curved forming area 31, on the other hand the material thickness of the forming body 30 varies over its width.

In the cavity 20, a gas pressure of less than 90 kPa prevails, whereby a gas flow through the forming body 30 and the reshaping tool 10 is produced, which is schematically represented in FIG. 3a by arrows. This results in a greater gas flow in the regions of smaller material thickness, since the forming body offers a smaller resistance to the gas flow there. When the forming area 30 is in contact with the glass tube 50, this results in a stronger negative pressure on the forming area 31 in the regions of the forming body 30 of smaller material thickness, and consequently stronger fixing of the surface of the glass tube 50 on the forming area 31.

The glass tube 50 represented in FIG. 3a has in its initial form an elliptical cross section. This is particularly advantageous in the embodiment represented there, since the elliptical form of the glass tube 50 is more similar to the curvature of the forming area 31 than a circular form would be, one effect of which is to allow quicker reshaping.

Figure 3B:
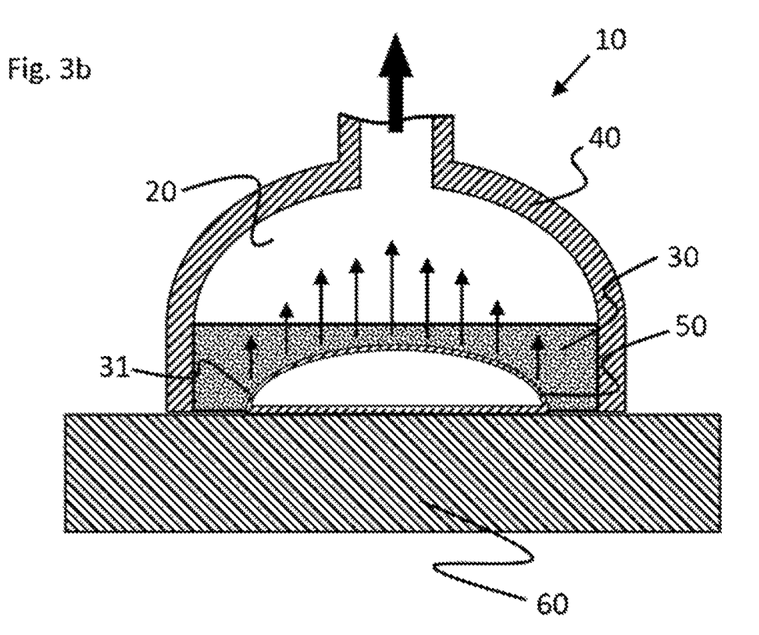
FIG. 3b shows the reshaping tool, the glass tube and the base as shown in FIG. 3a at the end of the reshaping of the glass tube by the reshaping tool in cross section perpendicularly to the longitudinal axis of the glass tube.

FIG. 3b shows the reshaping tool 10, the glass tube 50 and the base 60 as shown in FIG. 3a at the end of the reshaping of the glass tube by the reshaping tool 10. The glass tube 50 was pressed against the base 60 by means of the forming area 31 by moving the reshaping tool 10, resulting in the cross section shown of the glass tube after the reshaping. In the contact region with the forming area 30, the outer wall of the glass tube 50 is fixed by the negative pressure and lies against the forming areas 31 over the full area thereof. In this case, it is more strongly fixed in the regions of smaller material thickness of the forming body 30, that is to say in the middle region of the reshaped glass tube that is particularly susceptible to undesired deformation, than in the regions of greater material thickness.

FIGS. 4a to 4d show various examples of glass tubes with a cross section of a noncircular form that can be produced by means of the method according to the invention with high precision and high throughput. The respective aspect ratio of the glass tubes shown is obtained from the ratio of the width of the cross section B to the height H thereof.

Figure 4A:
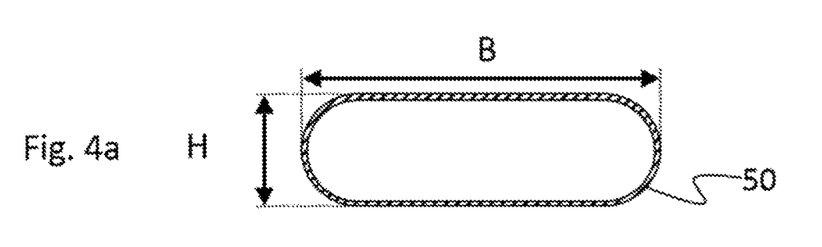
FIGS. 4a to d show four examples of glass tubes in plan view of the cross section that can be formed by reshaping by means of the method according to the invention.

FIG. 4a shows the cross section of a glass tube 50 as in FIG. 2b. The oval glass tube 50 has two planar longitudinal sides running parallel to one another and also two semicircularly rounded peripheral regions and resembles in its form the running track of a sports field. The wall thickness is constant over the entire circumference.

Figure 4B:
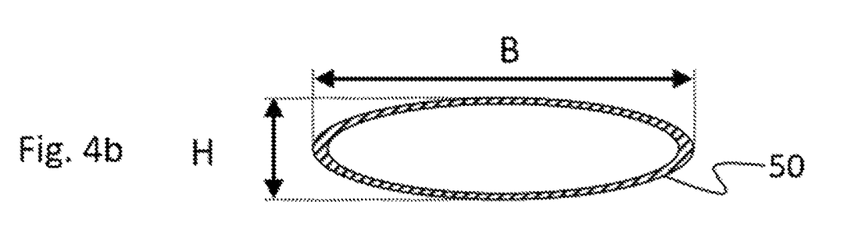

FIG. 4b shows a glass tube with an elliptical cross section. The wall thickness of such an elliptical tube may be constant over the entire circumference or, as represented in FIG. 4b, vary steadily and mirror-symmetrically.

Figure 4C:
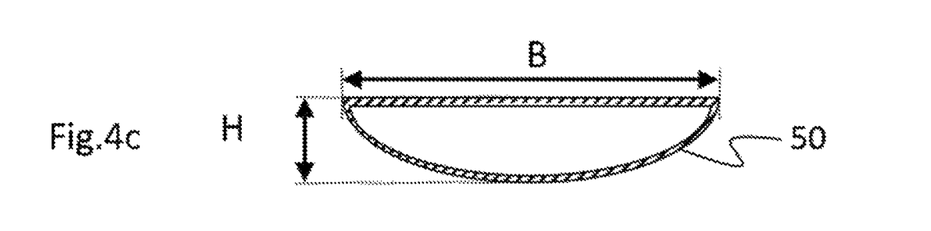
Figure 4D:
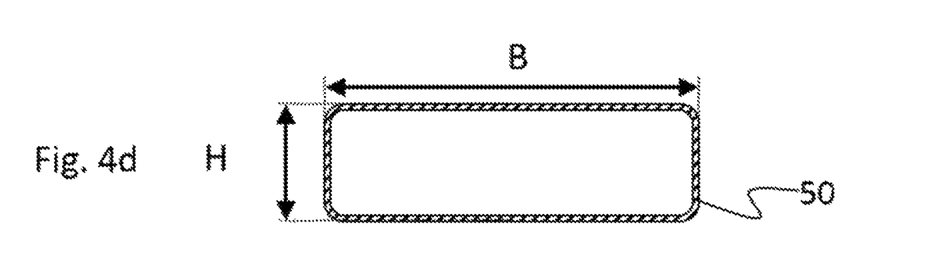

FIG. 4c shows a glass tube which has a planar longitudinal side and also a convexly curved side, the bend radii in the two corner regions being very small. The wall thickness in the region of the planar longitudinal side is constant. FIG. 4d shows a glass tube with a substantially rectangular cross section and rounded corners. The wall thickness is constant over the entire circumference.

In an exemplary embodiment, a glass tube 50 of DURAN® with a round cross section, an outside diameter of 54 mm, a wall thickness of 1.8 mm and a length of 170 mm is provided. DURAN® is a borosilicate glass, which approximately has the following composition in percent by weight on an oxide basis:

| | |
|---|---|
| $SiO_2$ | 81% by weight |
| $B_2O_3$ | 13% by weight |
| $Na_2O + K_2O$ | 4% by weight |
| $Al_2O_3$ | 2% by weight. |

The annealing point of DURAN® is about 560° C., the softening point is about 825° C.

The glass tube 50 is continuously heated in a tunnel oven to a temperature of 690° C. In order to avoid oxidation of the glass contact material, the oven is flushed with a reducing or inert gas, for example forming gas, nitrogen or argon. The glass tube 50 rests with its outer wall on a base 60 during the heating. The region of the base 60 that comes into contact with the glass tube comprising isostatically pressed graphite with a mirror-polished surface.

Furthermore, a reshaping tool 10 with a planar forming body 30, as schematically represented in FIGS. 1 and 2, is provided in the oven. The planar forming body 30 likewise comprises isostatically pressed graphite with a mirror-polished surface. The porosity of the forming body is 15%, its thickness 0.5 mm. For mechanical stabilization, the forming body has on its rear side webs with a thickness of 9.5 mm arranged in the form of a honeycomb. Formed in the interior of the reshaping tool is a cavity, which also comprises the intermediate spaces between the webs arranged in the form of a honeycomb and in which a pressure of 10 kPa is set by means of a rotary vane pump, so that a gas flow through the porous forming body 30 results.

As soon as the glass tube 50 has reached the target temperature with an accuracy of ±5 K, it is positioned in the oven under the reshaping tool in such a way that the surfaces of the base 60 and of the forming body 30 are aligned plane-parallel to one another. The temperature of the forming tool in this case corresponds to the temperature in the oven. In a next step, the reshaping tool 10 is moved perpendicularly to the longitudinal axis of the glass tube 50, so that the reshaping tool 10 exerts a compressive force on the outer surface of the glass tube 50 and presses it against the base 60. In this case, when it is in contact with the forming area 31, the glass tube 50 is fixed by the negative pressure on the forming area 31 without the surface of the glass tube being damaged. The fixing has the effect of preventing undesired dipping in the middle region of the tube 50, or even the complete collapse of the glass tube 50, and consequently sticking together of the inner surfaces of the tube 50.

The reshaping tool 10 is moved until a distance of 8 mm is achieved between the forming area 31 and the surface of the base 60. With a correspondingly exact design of the surfaces and the end position of the forming body 30 and of the base 60, an exact plane-parallelism of the planar regions of the outer surfaces of the reshaped tube 50 can be achieved.

This process consequently results in a reshaped glass tube 50 with a width of B=70 mm and a height of H=8 mm, corresponding to an aspect ratio of 8.75:1, the cross section of which corresponds substantially to the schematic representation in FIG. 4a.

The entire disclosures of all applications, patents and publications, cited above and below, and of corresponding German application DE 10 2017 202 762.2 filed Feb. 21, 2017, are hereby incorporated by reference.

The present invention will be illustrated below by a series of examples. However, the present invention is not limited to the examples mentioned.

EXAMPLES

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Method for producing a glass tube with a cross section of a noncircular form by reshaping, comprising at least the steps of:
   providing a glass tube having a longitudinal axis and an outer surface,
   heating the glass tube, providing at least one reshaping tool having an interior, which has a forming body with a forming area for reshaping the heated glass tube, the forming body comprising at least one open-porous material,
   setting a gas pressure in the interior of the at least one reshaping tool that is lower than 90 kPa, so that a negative pressure is produced on the forming area of the forming body, and
   reshaping the heated glass tube by applying a compressive force perpendicularly to the longitudinal axis of the glass tube, the compressive force being generated by the at least one reshaping tool and being applied to the outer surface of the glass tube,
   characterized in that the glass tube has an aspect ratio of a cross section, and the aspect ratio after the reshaping is greater than the aspect ratio before the reshaping.

2. Method according to claim 1, characterized in that the forming area is mirror-polished.

3. Method according to claim 1, characterized in that the forming body has a curved surface.

4. Method according to claim 1, characterized in that the outer surface of the glass tube being made to lie against at least part of the forming area by the negative pressure on the forming area of the forming body.

5. Method according to claim 1, characterized in that the at least one reshaping tool has in its interior at least one cavity.

6. Method according to claim 1, characterized in that the at least one open-porous material comprises graphite, ceramic and/or metal.

7. Method according to claim 1, characterized in that the at least one open-porous material has an open porosity of between 1% and 50%.

8. Method according to claim 1, characterized in that, before the heating, the glass tube provided has either a circular cross section or an elliptical cross section.

9. Method according to claim 1, characterized in that the glass tube is heated to a temperature between the annealing point and the softening point of the glass tube.

10. Method according to claim 1, characterized in that, before the reshaping, the pressure at least in a partial volume in the interior of the at least one reshaping tool is set to a value between 0.1 kPa and 30 kPa.

11. Method according to claim 1, characterized in that the outer surface of the glass tube is fixed by the negative pressure on the forming area of the forming body.

12. Method for producing a glass tube with a cross section of a noncircular form by reshaping, comprising at least the steps of:
provoding a glass tube having a longitudinal axis and an outer surface,
heating the glass tube, providing at least one reshaping tool having an interior, which has a forming body with a forming area for reshaping the heated glass tube, the forming body comprising at least one open-porous material,
setting a gas pressure in the interior of the at least one reshaping tool that is lower than 90 kPa, so that a negative pressure is produced on the forming area of the forming body, and
reshaping the heated glass tube by applying a compressive force perpendicularly to the longitudinal axis of the glass tube, the compressive force being generated by the at least one reshaping tool and being applied to the outer surface of the glass tube,
characterized in that the outer surface of the glass tube is fixed by the negative pressure on the forming area of the forming body.

13. Method according to claim 12, characterized in that, before the reshaping, the pressure at least in a partial volume in the interior of the at least one reshaping tool is set to a value between 0.1 kPa and 30 kPa.

14. Method for producing a glass tube with a cross section of a noncircular form by reshaping, comprising at least the steps of:
providing a glass tube having a longitudinal axis and an outer surface,
heating the glass tube, providing at least one reshaping tool having an interior, which has a forming body with a forming area for reshaping the heated glass tube, the forming body comprising at least one open-porous material,
setting a gas pressure in the interior of the at least one reshaping tool that is lower than 90 kPa, so that a negative pressure is produced on the forming area of the forming body, and
reshaping the heated glass tube by applying a compressive force perpendicularly to the longitudinal axis of the glass tube, the compressive force being generated by the at least one reshaping tool and being applied to the outer surface of the glass tube,
characterized in that the outer surface of the glass tube being made to lie against at least part of the forming area by the negative pressure on the forming area of the forming body.

15. Method according to claim 13, characterized in that, before the reshaping, the pressure at least in a partial volume in the interior of the at least one reshaping tool is set to a value between 0.1 kPa and 30 kPa.

* * * * *